United States Patent
Manders

(10) Patent No.: US 6,464,292 B2
(45) Date of Patent: Oct. 15, 2002

(54) OPEN ROOF CONSTRUCTION FOR A VEHICLE

(75) Inventor: Peter Christian Leonardus Johannes Manders, Horst (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/894,669

(22) Filed: Jun. 27, 2001

(65) Prior Publication Data

US 2001/0054834 A1 Dec. 27, 2001

(30) Foreign Application Priority Data

Jun. 27, 2000 (NL) .............................................. 1015541

(51) Int. Cl.[7] .............................................. B60J 7/043
(52) U.S. Cl. .................................. 296/214; 296/216.08
(58) Field of Search ...................... 296/216.06–216.08, 296/214

(56) References Cited

U.S. PATENT DOCUMENTS

| | | | |
|---|---|---|---|
| 2,434,711 A | 1/1948 | Mobbs et al. | |
| 3,558,183 A | 1/1971 | Sigmund | |
| 4,890,880 A | 1/1990 | Sakamoto | 296/214 |
| 4,936,623 A | 6/1990 | Huyer | 296/220 |
| 5,906,412 A | 5/1999 | Matsumura | 296/223 |
| 6,164,718 A | 12/2000 | Stallfort | 296/222 |

FOREIGN PATENT DOCUMENTS

| | | |
|---|---|---|
| DE | 2234852 | 1/1974 |
| EP | 0 338 614 | 10/1989 |
| EP | 0 802 077 A1 | 10/1997 |
| EP | 0 956 988 A2 | 11/1999 |
| EP | 0 963 888 A2 | 12/1999 |
| JP | 38126 | 3/1984 |
| JP | 359202935 | 11/1984 |
| JP | 246824 | 10/1990 |
| JP | 10166866 | 6/1998 |
| WO | WO 99/55546 | 11/1999 |

OTHER PUBLICATIONS

U.S. application No. 09/674,125, Hermsen et al., filed Oct. 26, 2000.
U.S. application No. 09/829,878, Hermsen et al., Apr. 10, 2001.

*Primary Examiner*—Dennis H. Pedder
(74) *Attorney, Agent, or Firm*—Westman, Champlin & Kelly, P.A.; S. Koehler

(57) ABSTRACT

An open roof construction or assembly for a vehicle having an opening in its fixed roof comprises a stationary part to be fixed to the roof. An upper closure element supported by said stationary part is adjustable between a closed position, in which it closes the roof opening, and an open position, in which it releases the roof opening at least partially. A slidable lower closure element supported by said stationary part can move forward and backward, to which end it is slidably guided in guide rails at its edges or outer portions. The lower closure element includes hook members as engaging elements at said edges, which engage in the associated guide rails and which run substantially clear of the guide rails during normal operation of the open roof construction. The engaging elements will move into engagement with the guide rails when an excessive, upward load is exerted on the lower closure element, so as to retain said lower closure element in its correct position. In this way there is provided additional protection against the sun screen being forced out.

10 Claims, 4 Drawing Sheets

OPEN ROOF CONSTRUCTION FOR A VEHICLE

BACKGROUND OF THE INVENTION

The invention relates to an open roof construction for a vehicle having an open roof. Such an open roof construction is known, for example, from WO-A-99/55546 in the name of the present applicant. The lower closure element of said known open roof construction is in the form of a sun screen, which is guided in grooves of the guide rails on special sliding shoes. The sliding shoes are spring-loaded. In case of excessive outward forces being exerted on the lower closure element, for example in the case of a collision, there is a risk of the lower closure element being pressed outwards and becoming detached, because the spring load on the sliding shoes does not offer sufficient resistance.

SUMMARY OF THE INVENTION

According to the present invention, engaging elements form additional retaining elements, which function to prevent the lower closure element from becoming detached, without said engaging elements having an adverse effect on the operation of the open roof construction during normal operation thereof. Ultimately, the engaging elements run clear, or substantially clear, of the guide rails, as a result of which the sliding resistance of the lower closure element is not affected.

In one embodiment, the engaging elements include hook-shaped elements. Said hook-shaped elements are oriented in such a manner as to engage in or behind a part of the guide rails in case of an excessive upward load being exerted on the lower closure element, as a result of which the lower closure element is prevented from moving out any further.

BRIEF DESCRIPTION OF THE DRAWINGS

The invention will now be explained in more detail with reference to the drawings, which schematically show exemplary embodiments of the open roof construction according to the invention.

DETAILED DESCRIPTION OF THE ILLUSTRATIVE EMBODIMENTS

Figure 1:
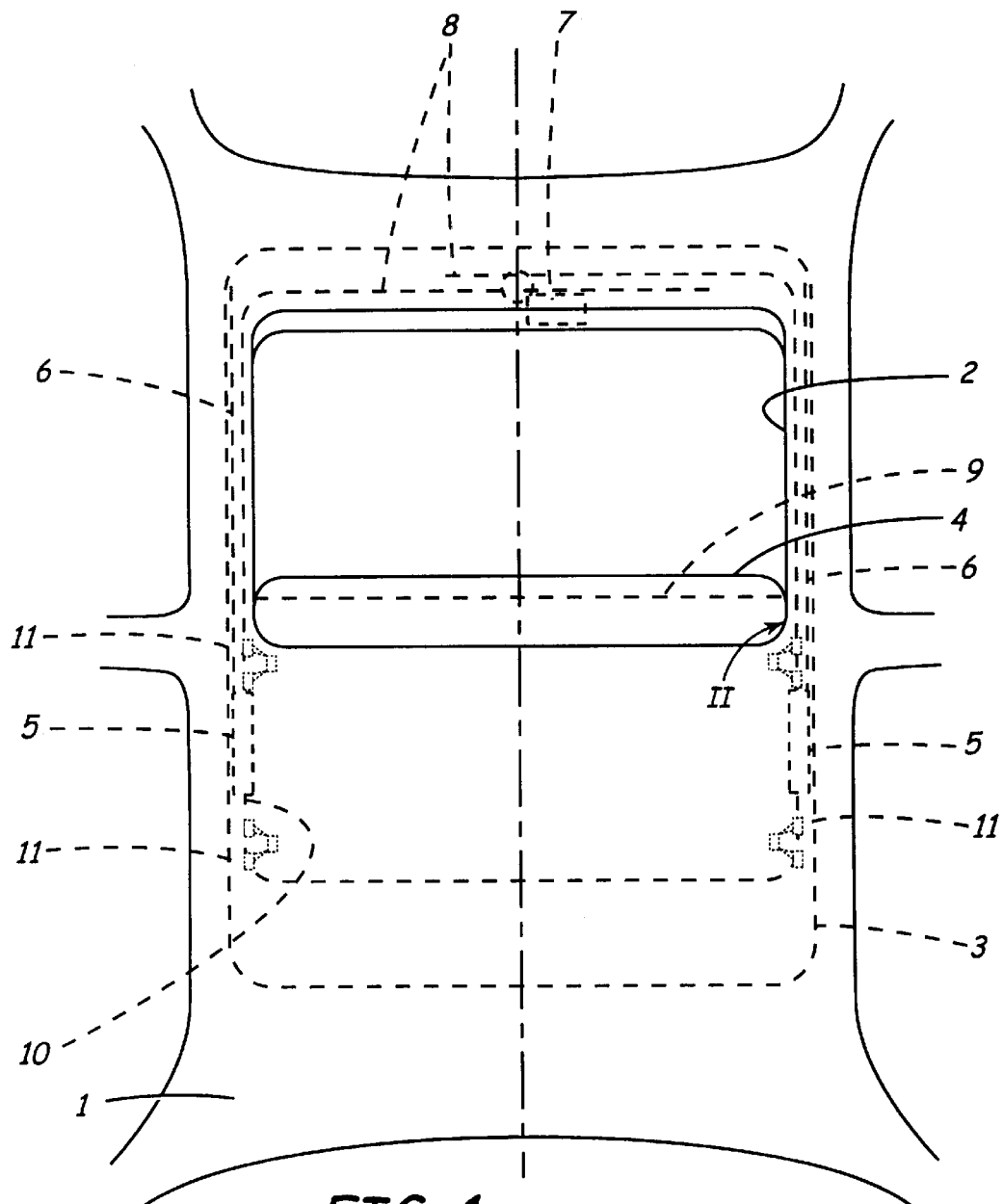
FIG. 1 is a very schematic top plan view of a vehicle roof fitted with the exemplary embodiment of the open roof construction according to the invention.

FIG. 1 shows a fixed roof 1 of a motor vehicle, in this case a passenger car. Said fixed roof 1 is provided with an at least substantially rectangular roof opening 2 for the purpose of mounting an open roof construction therein. The open roof construction or assembly comprises a stationary part, in this case a frame 3, which is fixed to the underside of the fixed roof 1 of the vehicle.

In the illustrated embodiment, the open roof construction is a so-called sliding roof or sliding-tilt roof, which comprises a panel 4, which is preferably transparent and which is more or less rigid in this embodiment, as the upper closure element. Panel 4 is capable of selectively closing the roof opening 2 or releasing it to a greater or lesser extent. In addition, panel 4 is laterally supported by operating mechanisms 5, which are slidably accommodated in guide rails 6. Guide rails 6 are mounted on frame 3 or alternatively form part of frame 3. Additionally, guide rails 6 extend in a longitudinal direction, parallel to each other, on either side of roof opening 2 and rearwards thereof. Said operating mechanisms 5 can be moved synchronously in guide rails 6, thus moving the panel 4 not only in a longitudinal direction (front to back) but also in a vertical direction. To this end the operating mechanisms 5 are actuated from a driving device 7, such as an electric motor or hand crank, for example via pull-push cables 8.

Besides panel 4, the open roof construction also includes a lower closure element, in this case in the form of a sun screen 9, which is guided, for example, slidably with its side edges or outer portions proximate guideways 10 of guide rails 6. Sun screen 9 can be moved forward and rearward, for example manually or automatically, or be moved along with panel 4. In this exemplary embodiment, the guideways 10 are constructed as guide grooves.

Sun screen 9 is fitted with a number of sliding shoes 11, four sliding shoes 11 on each side edge of the sun screen in this embodiment, so as to enable sliding movement of sun screen 9 in guide grooves 10.

Figure 2:
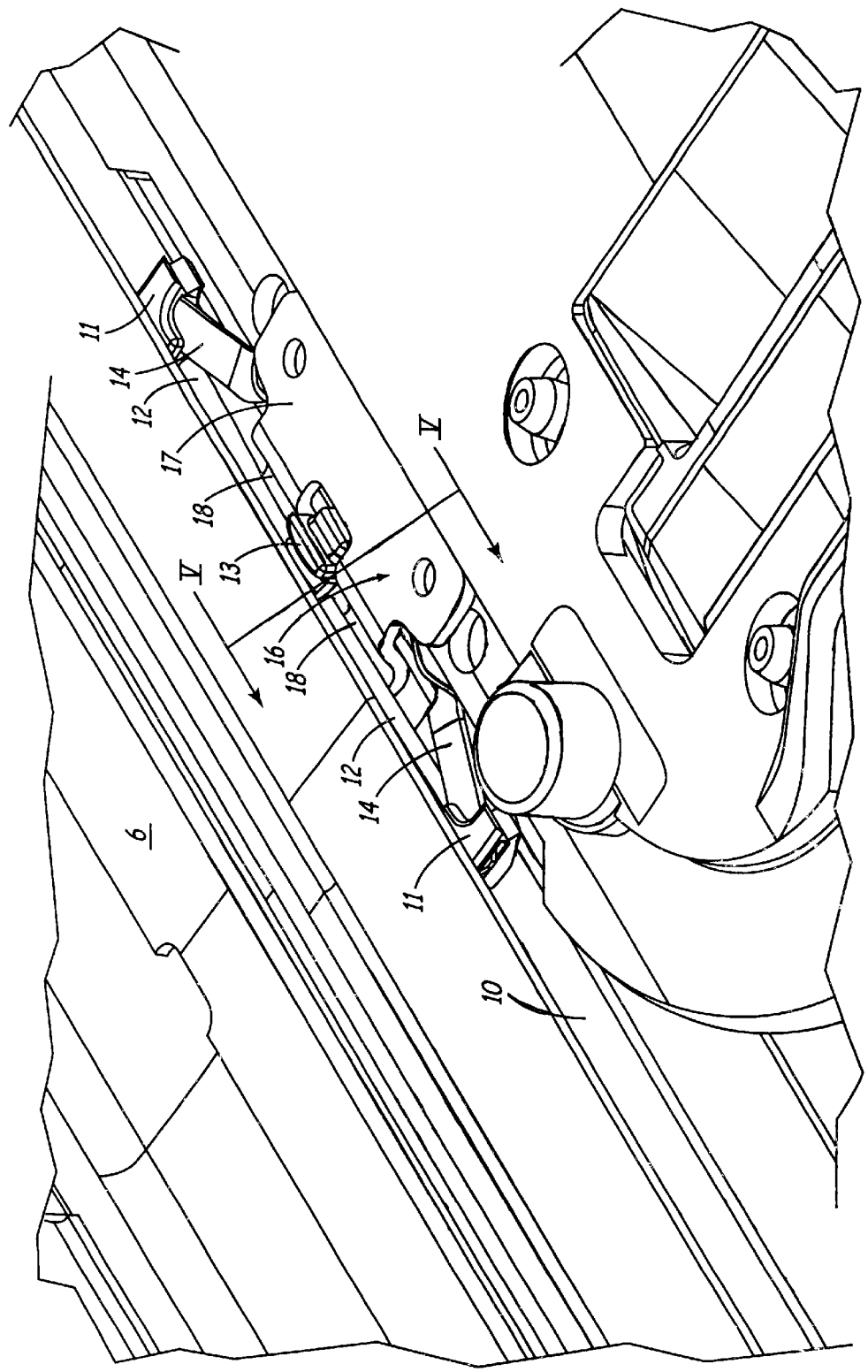
FIG. 2 is a larger-scale, perspective view of a part of the open roof construction, seen in the direction indicated by arrow II in FIG. 1.
Figure 3:
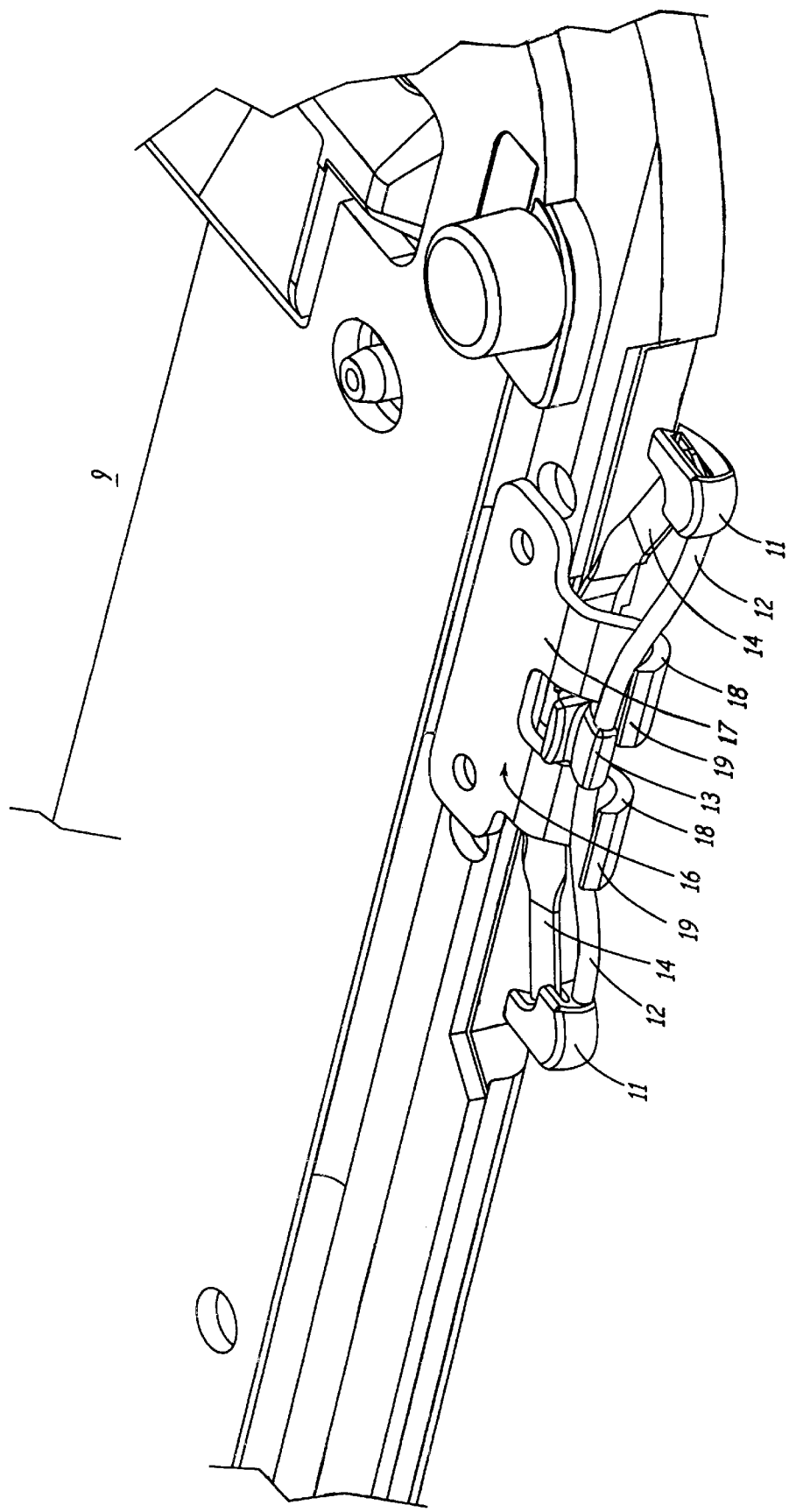
FIG. 3 shows the same part of the open roof construction illustrated in FIG. 2, seen from another side, from which the guide rail has been left out.
Figure 4:
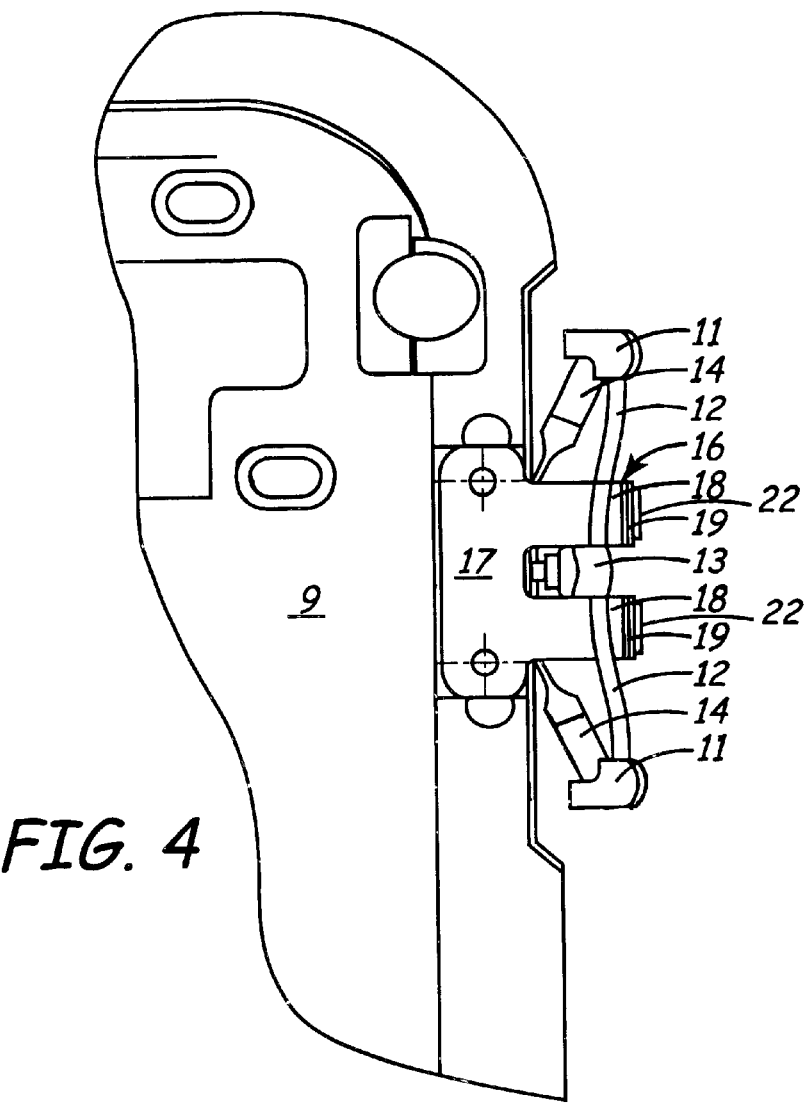
FIG. 4 is a smaller-scale top plan view of the subject matter of FIG. 3 with optional pressing elements.

FIGS. 2–4 illustrate on a larger scale the mating relationship between the two sliding shoes 11 and the associated guide groove 10. The two sliding shoes 11 are joined to form one unit, and they are each connected to a central auxiliary sliding shoe 13 with an elongate, flexible connecting member 12. Furthermore, the end of a spring member 14 extending from a mounting element 15 (FIG. 5) engages in each sliding shoe 11. Sliding shoes 11 can be positioned symmetrically on either side of the mounting element 15 and the auxiliary sliding shoe 13, and each spring member 14 is a flat, twisted leaf spring in this embodiment, which allows springing movement in a horizontal and a vertical plane. Said sliding shoe units do not by themselves form part of the invention; they are disclosed in detail in WO-A-99/55546, whose contents are incorporated herein by reference thereto.

As is furthermore shown in FIGS. 2–4, the sliding shoe unit comprises an engaging element 16, which includes a flat, plate-shaped fixing member 17 and two hook-shaped members 18 formed in one piece therewith. Fixing member 17 is provided with holes for fixing means (fasteners) so as to make it possible to fix the engaging element 16 to the sun screen 9. Hook members 18 are positioned on either side of the central auxiliary sliding shoe 13, and they extend underneath the connecting members 12. The connecting members 12 are thereby positioned in the cup-like recess of the hook members 18, as it were.

Figure 5:
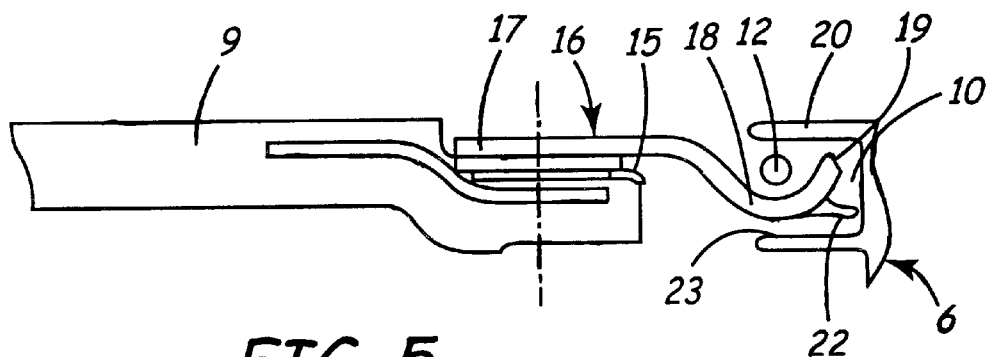
FIG. 5 is a sectional view along line V—V in FIG. 2 with some elements removed for clarity and optional pressing elements.

In FIG. 5, the dimensions and the position of the hook members 18 are shown to be such that said hook members 18 run clear of the guide groove 10 of the guide rail 6, within which the sliding shoes 11 move, during normal operation. Thus the normal operation of the open roof construction, and in particular the movement of the sun screen 9, are not influenced by the hook members 18. In the embodiment according to FIG. 5, the hook members 18 are shown to have a more or less sharp end 19 (e.g. a single or plurality of blade edges, pointed tips, etc.) at their free end, which is formed on an end portion of the hook member 18 that slopes upwards in an outward direction.

When an excessive load is exerted on the sun screen 9 in upward direction, the sun screen 9 will be pressed upwards, whereby the spring members 14 and the connecting members 12 will deform, in such a manner that the sharp ends 19 of hook members 18 will come into engagement with an upper flange 20 of guide groove 10, causing the harder (e.g. steel) engaging element 16 to hook into the softer material (e.g. aluminium) of the guide rail 6, as a result of which the sun screen 9 is prevented from moving out any further.

Figure 6:
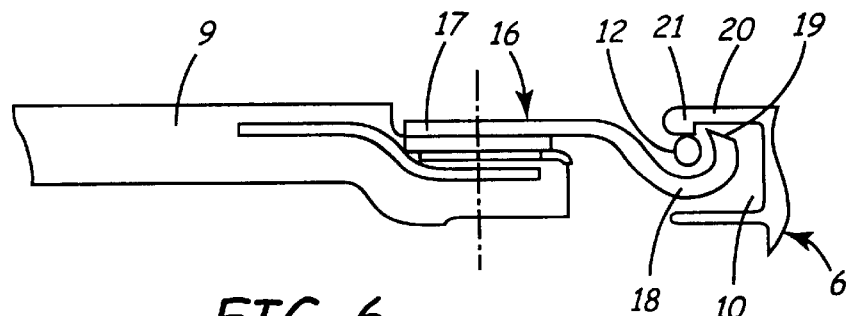
FIG. 6 is a view similar to FIG. 5 of an alternative embodiment of the open roof construction according to the invention.

FIG. 6 shows another variant of the engaging element 16 and the guide rail 6 that mates therewith. A downwardly extending edge 21 is formed on the free edge of the upper flange 20 of the guide groove 10 of guide rail 6. Furthermore, the end portion of hook members 16 slopes upwards in inward direction, in such a manner that the sharp ends 19 of hook members 18 can readily engage behind the edge 21 of guide rails 6 when a load is exerted on sun screen 9 in an upward direction, as a result of which the sun screen 9 is retained even more securely in guide rails 6.

It is noted that the engaging elements 16 may furthermore include pressing element or projection 22, which preferably extend into guide grooves 10 slightly outward and/or downward of the hook members 18 as illustrated in FIG. 5. In an inclined position of sun screen 9 or engaging element 16 (when the sun screen 9 starts to bulge as a result of the upward force that is exerted on the sun screen 9) the pressing elements 22 will come into contact with lower flanges 23 of the respective guide grooves 10, as a result of which the sharp ends 19 of hook members 18 will be loaded in an upward direction and be pressed into the upper flange 20 of guide grooves 10, thus effecting an even firmer engagement. In principle, said pressing element 22 do not come into contact with the guide groove 10 of the guide rails 6 during normal operation of the open roof construction. It is conceivable, of course, that either of said pressing elements 22 or said engaging elements 16 will come into contact with the guide groove 10.

From the foregoing it will be apparent that the invention provides an open roof construction which provides additional protection against the sun screen 9 or the like being forced outwards in exceptional situations, without this having an adverse effect on the normal operation of the open roof construction.

The invention is not restricted to the embodiments as described above and shown in the drawings, which can be varied in several ways without departing from the scope of the invention as defined in the claims. Thus, other configurations of the engaging elements 16 can be used besides hook members 18, as long as said engaging elements 16 are capable of performing the retaining function that prevents the lower closure element 9 from becoming detached. Besides being configured as a sun screen, the lower closure element 9 can also be configured as an insulation screen or the like.

What is claimed is:

1. An open roof assembly for a vehicle having an opening in its fixed roof, comprising:

a stationary part to be fixed to the roof;

an adjustable upper closure element supported by said stationary part, which is adjustable between a closed position, in which it closes the roof opening, and an open position, in which it releases the roof opening at least partially; and a slidable lower closure element supported by said stationary part, which can move forward and backward and which is guided in guide rails at its outer portions, said lower closure element being provided with engaging elements at said outer portions, which extend into the associated guide rails and which run substantially clear of the guide rails during normal operation of the open roof construction, but which will move into engagement with the guide rails when an excessive, upward load is exerted on the lower closure element, so as to retain said lower closure element in position relative to the guide rails.

2. The open roof assembly of claim 1, wherein said engaging elements include hook members.

3. The open roof assembly of claim 1, wherein said lower closure element is guided in the guide rails on sliding shoes, which are connected to the associated outer portions of the lower closure element, and wherein said engaging elements are disposed near said sliding shoes.

4. The open roof assembly of claim 3, wherein said guide rails include grooves, which are open in the direction of the lower closure element, which grooves have a downwardly extending edge, behind which said engaging elements can engage.

5. The open roof assembly of claim 4, wherein said engaging elements include hook members and said hook members are configured as upwardly curved hooks having a sharply pointed end, which extends towards the upper side of the respective groove of the guide rails.

6. The open roof assembly of claim 3, wherein respective pairs of sliding shoes form units, while an engaging element is positioned between the sliding shoes that form a pair.

7. The open roof assembly of claim 6, wherein the sliding shoe unit comprising said pair of sliding shoes comprises a central auxiliary sliding shoe, while the engaging element includes two hook members, which are each positioned between the auxiliary sliding shoe and one of said sliding shoes.

8. The open roof assembly of claim 1, wherein said engaging element include a plate-shaped mounting element, which is fixed to the upper side of the lower closure element with a fastener.

9. The open roof assembly of claim 1, wherein the lower closure element is provided with pressing elements extending into the guide rails near said engaging elements, which come into contact with a bottom side of the respective guide rail in an inclined position of the engaging elements, thereby forcing the engaging elements to engage the guide rail.

10. The open roof assembly of claim 1, wherein the upper closure element includes an at least partially transparent panel, while the lower closure element is configured as a sun screen.

* * * * *